(12) United States Patent
Kim

(10) Patent No.: US 11,874,136 B2
(45) Date of Patent: Jan. 16, 2024

(54) SYSTEM FOR STORING AND UPDATING BUMP INFORMATION

(71) Applicants: Hyundai Motor Company, Seoul (KR); Kia Corporation, Seoul (KR)

(72) Inventor: Hyun Kyu Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 134 days.

(21) Appl. No.: 17/510,708

(22) Filed: Oct. 26, 2021

(65) Prior Publication Data

US 2022/0381581 A1 Dec. 1, 2022

(30) Foreign Application Priority Data

Jun. 1, 2021 (KR) ........................ 10-2021-0071017

(51) Int. Cl.
*G01C 21/00* (2006.01)
*B60W 30/08* (2012.01)
*B60W 40/06* (2012.01)

(52) U.S. Cl.
CPC ......... *G01C 21/3822* (2020.08); *B60W 30/08* (2013.01); *B60W 40/06* (2013.01); *G01C 21/3848* (2020.08); *G01C 21/3889* (2020.08); *B60W 2552/35* (2020.02)

(58) Field of Classification Search
CPC ............ G01C 21/3822; G01C 21/3848; G01C 21/3889; B60W 30/08; B60W 40/06; B60W 2030/082; B60W 2552/35; B60R 16/023; B60R 21/013; B60Y 2300/095
See application file for complete search history.

(56) References Cited

U.S. PATENT DOCUMENTS

| | | | | |
|---|---|---|---|---|
| 2011/0112764 A1* | 5/2011 | Trum | ................. | G08G 1/09675 701/469 |
| 2014/0303844 A1* | 10/2014 | Hoffmann | .............. | B60G 17/08 701/37 |
| 2015/0291177 A1* | 10/2015 | Lee | ........................ | B60W 40/06 73/146 |
| 2016/0259814 A1* | 9/2016 | Mizoguchi | .............. | G06F 16/29 |
| 2018/0079272 A1* | 3/2018 | Aikin | .................. | B60G 17/0195 |
| 2019/0316914 A1* | 10/2019 | Shin | ........................ | G01C 21/30 |
| 2019/0344634 A1* | 11/2019 | Kim | .................... | B60G 17/0165 |
| 2020/0346654 A1* | 11/2020 | Kojo | ................. | G08G 1/096888 |

FOREIGN PATENT DOCUMENTS

| | | |
|---|---|---|
| KR | 101933580 B1 | 12/2018 |
| KR | 102042364 B1 | 11/2019 |

* cited by examiner

*Primary Examiner* — Rachid Bendidi
*Assistant Examiner* — Dana F Artimez
(74) *Attorney, Agent, or Firm* — Slater Matsil, LLP

(57) ABSTRACT

A vehicle control system includes a communication circuit, an internal sensor, and a controller connected to the communication circuit and the internal sensor. The controller is configured to detect an impact to a vehicle through the internal sensor, calculate an impulse for the detected impact, estimate a bump shape based on the calculated impulse, match first bump information that represents the estimated bump shape and second bump information acquired from a database by using the communication circuit, and update bump information of the database based on a matching result.

19 Claims, 13 Drawing Sheets

SYSTEM FOR STORING AND UPDATING BUMP INFORMATION

CROSS-REFERENCE TO RELATED APPLICATIONS

This application claims the benefit of Korean Patent Application No. 10-2021-0071017, filed in the Korean Intellectual Property Office on Jun. 1, 2021, which application is hereby incorporated herein by reference.

TECHNICAL FIELD

Embodiments of the present disclosure relate to a technology for storing and updating bump information.

BACKGROUND

In order to cause vehicles to reduce driving speeds, obstacles, such as speed bumps, structures, or bumps, are installed on roads. A driver of a vehicle reduces an impact felt by a passenger by reducing a driving speed when an obstacle is detected. In recent years, a technology of allowing a vehicle to directly detect an obstacle installed on the front side of the vehicle and inform a result to a driver to reduce an impact has been introduced. For example, the vehicle may detect a speed bump that is present in front of the vehicle by a specific distance through a navigation system and a positioning system or may detect an obstacle by utilizing a sensor.

SUMMARY

Embodiments of the present disclosure can solve problems occurring in the prior art while advantages achieved by the prior art are maintained intact.

Because an impact felt by a passenger when a vehicle passes on an obstacle may be different according to a kind and a form of the obstacle, a state of a road surface, a driving speed, a driving environment, a kind, and a loading state of the vehicle, the impact felt by a user may not be reduced even though the vehicle may detect the obstacle installed on the front side through the above-mentioned methods. Furthermore, the form of the obstacle may be changed over time even when the obstacle is one, through which the vehicle has passed before, inconvenience of the passenger still cannot be solved when the change is not reflected. The vehicle may measure a front obstacle by using a precise sensor, such as a lidar device, but the sensor is equipment of a high price and requires high costs.

The technical problems to be solved by embodiments of the present inventive concept are not limited to the aforementioned problems, and any other technical problems not mentioned herein will be clearly understood from the following description by those skilled in the art to which the present disclosure pertains.

According to an embodiment of the present disclosure, a vehicle control system includes a communication circuit, an internal sensor, and a controller connected to the communication circuit and the internal sensor, and the controller is configured to detect an impact to a vehicle through the internal sensor, calculate an impulse for the detected impact, estimate a bump shape based on the calculated impulse, match first bump information that represents the estimated bump shape and second bump information acquired from a database by using the communication circuit, and update bump information of the database based on a matching result.

According to an embodiment of the present disclosure, a method for a vehicle control system includes detecting an impact to a vehicle, calculating an impulse for the detected impact, estimating a bump shape based on the calculated impulse, matching first bump information that represents the estimated bump shape and second bump information acquired from a database by using the communication circuit, and updating bump information of the database based on a matching result.

According to an embodiment of the present disclosure, a computer readable non-transitory recording medium that stores programs for executing operations of detecting an impact to a vehicle, calculating an impulse for the detected impact, estimating a bump shape based on the calculated impulse, matching first bump information that represents the estimated bump shape and second bump information acquired from a database by using the communication circuit, and updating bump information of the database based on a matching result.

BRIEF DESCRIPTION OF THE DRAWINGS

The above and other objects, features and advantages of embodiments of the present disclosure will be more apparent from the following detailed description taken in conjunction with the accompanying drawings, in which.

With regard to description of drawings, the same or similar components may be marked by the same or similar reference numerals.

DETAILED DESCRIPTION OF ILLUSTRATIVE EMBODIMENTS

Figure 1:
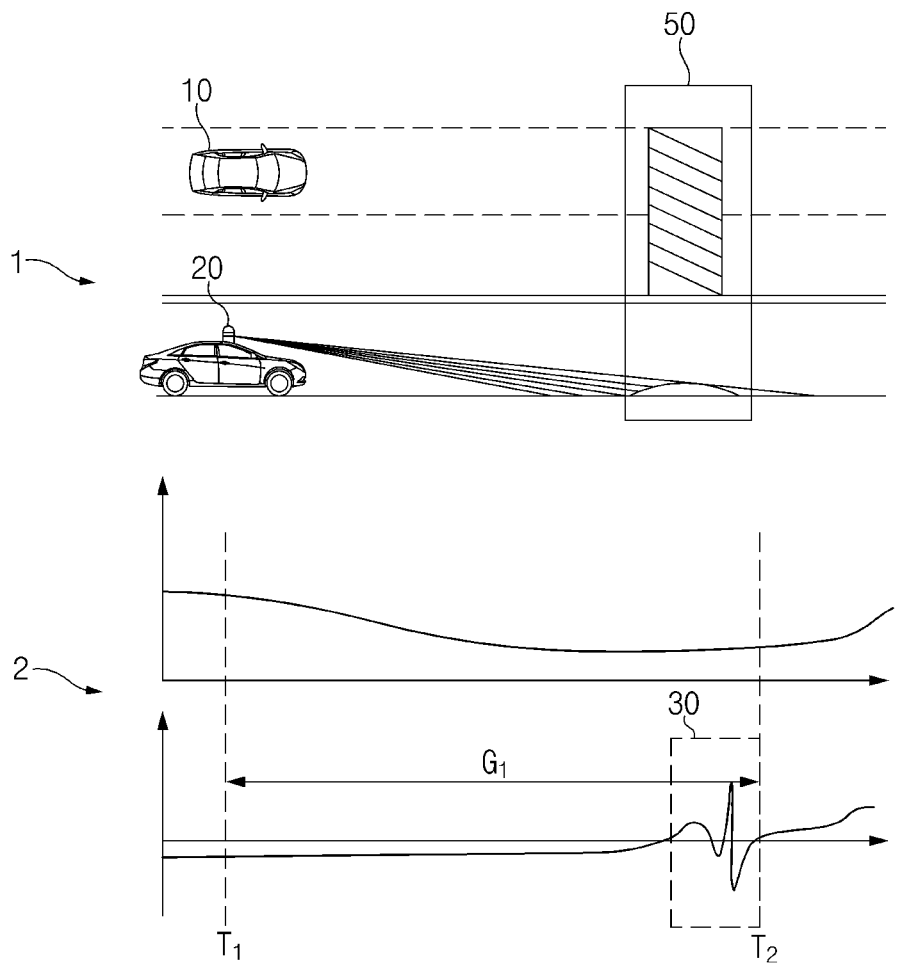
FIG. 1 illustrates driving data according to passes of bumps by vehicles.

Hereinafter, various embodiments of the present disclosure will be described with reference to the accompanying drawings. Accordingly, those of ordinary skill in the art will recognize that modifications, equivalents, and/or alternatives on the various embodiments described herein can be variously made without departing from the scope and spirit of the present disclosure.

Various embodiments of the present disclosure and the terms used herein do not limit the technical features described in the present disclosure to specific embodiments, and should be construed to include various modifications, equivalents, or replacements of the embodiments. With regard to the description of drawings, similar components may be denoted by similar reference numerals. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd" or "first" and "second" may be used to simply distinguish a corresponding component from another, and does not limit the components in other aspects (e.g., an importance or an order). It is to be understood that if an element (e.g., a first element) is referred to, with or without the term "operatively" or "communicatively", as "coupled with" or "connected with", it means that the element may be coupled with the other element directly (e.g., by wire), wirelessly, or via a third element.

The term "module" used in various embodiments of the present disclosure may include a unit configured in hardware, software, or firmware, and for example, may be used interchangeably with the terms such as logic, a logic block, a component, or a circuit. The module may be an integral component, or a minimum unit or a part which performs one or more functions. For example, according to an embodiment, the module may be implemented in a form of an application-specific integrated circuit (ASIC).

Various embodiments of the present disclosure may be implemented by software (e.g., a program) including one or more instructions stored in a storage medium (e.g., an internal memory or an external memory) that may be read by a machine. For example, a device may call, among one or more instructions stored in a storage medium, at least one instruction, and may execute the instruction. This allows at least one function to be performed according to the called at least one instruction. The one or more instructions may include a code that is made by a compiler or a code that may be executable by an interpreter. The storage medium that may be read by a device may be provided in a form of a non-transitory storage medium. Here, the 'non-transitory storage medium' means that the storage medium is a tangible device and does not include a signal (e.g., an electromagnetic wave), and with regard to the term, a case, in which data are semi-permanently stored in the storage medium, and a case, in which data are temporarily stored in the storage medium, are not distinguished.

According to an embodiment, the methods according to various embodiments of the present disclosure may be provided to be included in a computer program product. The computer program product may be traded between a seller and a purchaser. The computer program product may be distributed in a form of a storage medium that may be read by a device (e.g., a compact disk read only memory (CD-ROM)) or may be distributed (e.g., downloaded or uploaded) through an application store or directly or online between two user devices. In the online distribution, at least a portion of the computer program product may be at least temporarily stored in a storage medium, such as a server of a manufacturer, a server of an application store, or a memory of a relay server, which may be read by a device, or temporarily generated.

According to various embodiments, elements (e.g., modules or programs) of the above-described elements may include one or a plurality of entities, and some of the plurality of entities may be disposed to be separated from the other elements. According to various embodiments, among the above-described elements, one or more elements or operations may be omitted or one or more other elements or operations may be added. Alternatively or additionally, the plurality of elements (e.g., modules or programs) may be integrated into one element. In this case, the integrated elements may perform one or more functions of the elements of the plurality of elements in a way that is the same as or similar to the functions performed by the corresponding elements of the plurality of elements before the integration. According to various embodiments, the operations performed by modules, programs, or other elements may be executed sequentially, in parallel, repeatedly, or heuristically, one or more operations may be executed in another sequence or omitted, or one or more other operations may be added.

FIG. 1 illustrates driving data according to passes of bumps by vehicles. Although embodiments, in which a vehicle passes on a 'bump', will be described in FIG. 1 and the following description, the same principle may be applied to other obstacles, such as a speed bump, a structure, and a pot hole.

In reference numeral 2 of FIG. 1, the transverse axes of two graphs may represent time, and the longitudinal axis of the upper graph may represent speed of a vehicle 10 and the longitudinal axis of the lower graph may represent impulse. Referring to reference numeral 1, it is necessary to decelerate the vehicle 10 to reduce an impact felt by a passenger when the vehicle 10 passes on a bump 50. The bump 50 may be detected by naked eyes of a driver, but an uncomfortable feeling of the passenger may be increased due to an unpredicted impact 30 when the driver fails to recognize the bump 50 at a time point $T_1$, at which the driver has to start to decelerate the vehicle and recognizes the bump 50 only at $T_2$ after the vehicle 10 passes through the bump 50. The difference $G_1$ between the recognition time points requires an attention of the driver, but it may be difficult to narrow the difference between the time points by the driver who drives the vehicle for a long time or has a talk with a fellow passenger. The vehicle 10 may detect the bump 50 through a sensor 20 such as a lidar device instead of the driver. However, in order to precisely measure the bump 50, a sensor of a high performance is necessary and thus costs increase. The vehicle 10 may recognize the bump 50 installed at a specific location in advance by using a navigation device and a positioning system. However, because the impact 30 transmitted to the passenger is based on dynamic characteristics of the vehicle, it may vary according to a kind, a loading state, and a driving speed of the vehicle, a situation of a road (e.g., a construction, a damage, or a change of the structure of the road), and the like, and data using the navigation device cannot precisely reflect the situation.

According to the embodiments, the vehicle control system installed in the vehicle 10 may increase the reliability of the stored data by precisely measuring an impulse due to the bump 50 without using an equipment of a high price and updating the data in the database after the vehicle 10 passes through the bump 50.

Figure 2:
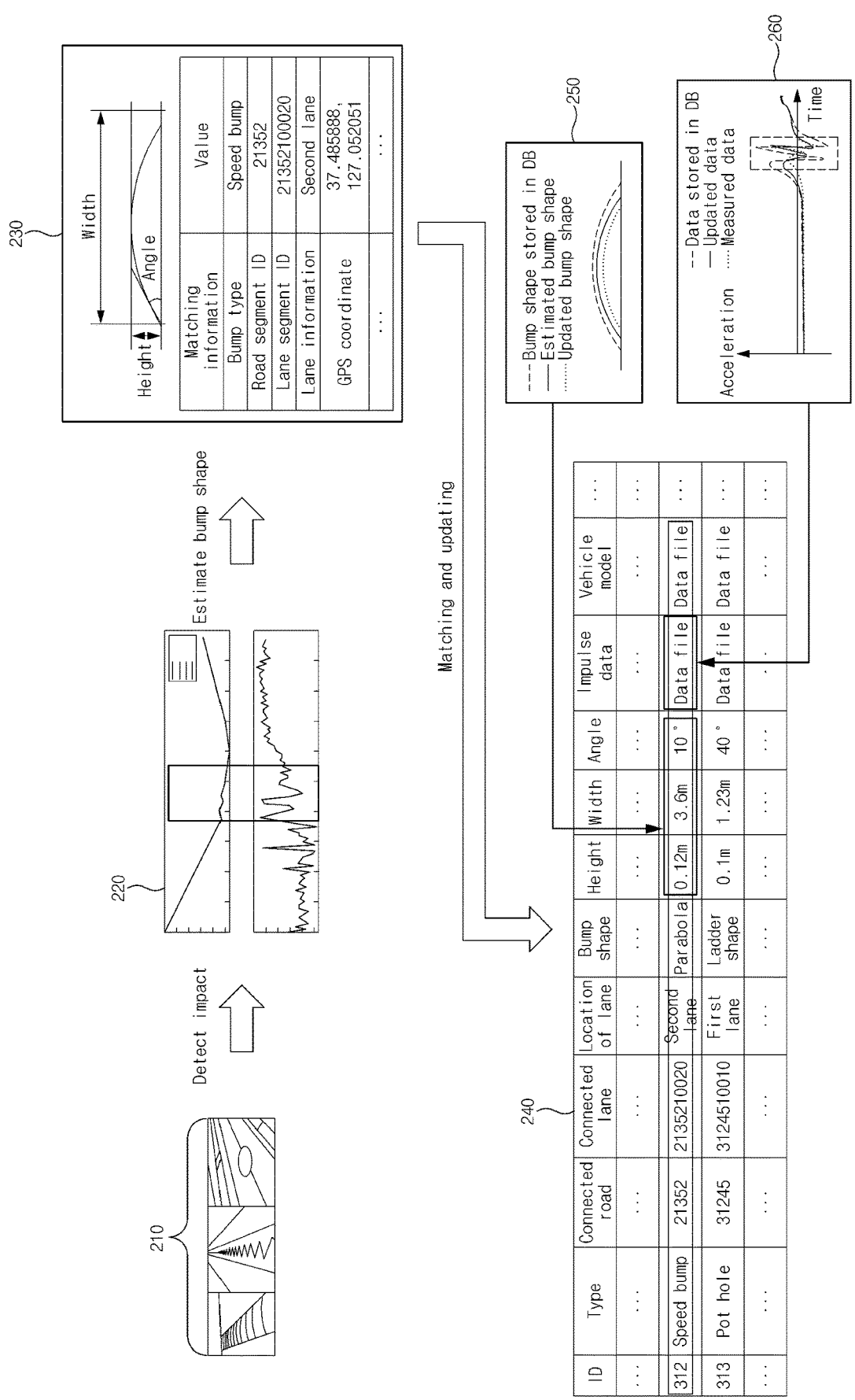
FIG. 2 illustrates an operation of updating bump information according to various embodiments.

FIG. 2 illustrates an operation of updating bump information according to various embodiments.

Referring to FIG. 2, the vehicle control system may detect an impact when the vehicle passes various forms of bumps 210 (or a speed bump, a structure, or a pot hole). The vehicle control system may calculate an impulse for the detected impact, and may generate data 220 for the calculated impulse. The vehicle control system may estimate a shape of the bump 210, through which the vehicle has passed, by using the generated data 220. The shape, for example, may represent at least one of a width, a height, or an angle of the bump 210. Furthermore, the shape may represent a shape of a bump, such as an arc, a parabola, or a ladder shape. The vehicle control system may generate bump information 230 on the estimated shape of the bump 210. The bump information 230 may include information related to a location at which the bump is installed (for example, a global positioning system (GPS) coordinates, an identification (ID) of a road, and a lane ID, lane information, and the like) as well as the shape of the bump. The vehicle control system may match the generated bump information 230 with bump information 240 stored in the database in advance. The vehicle control system may update the bump information 240 stored in advance through a matching result. For example, the vehicle control system may optimize bump shape information 250 and also optimize impulse data 260 for the bump 210 through comparison of the bump information 230 generated by the vehicle control system and the bump information 240 stored in advance.

Figure 3:
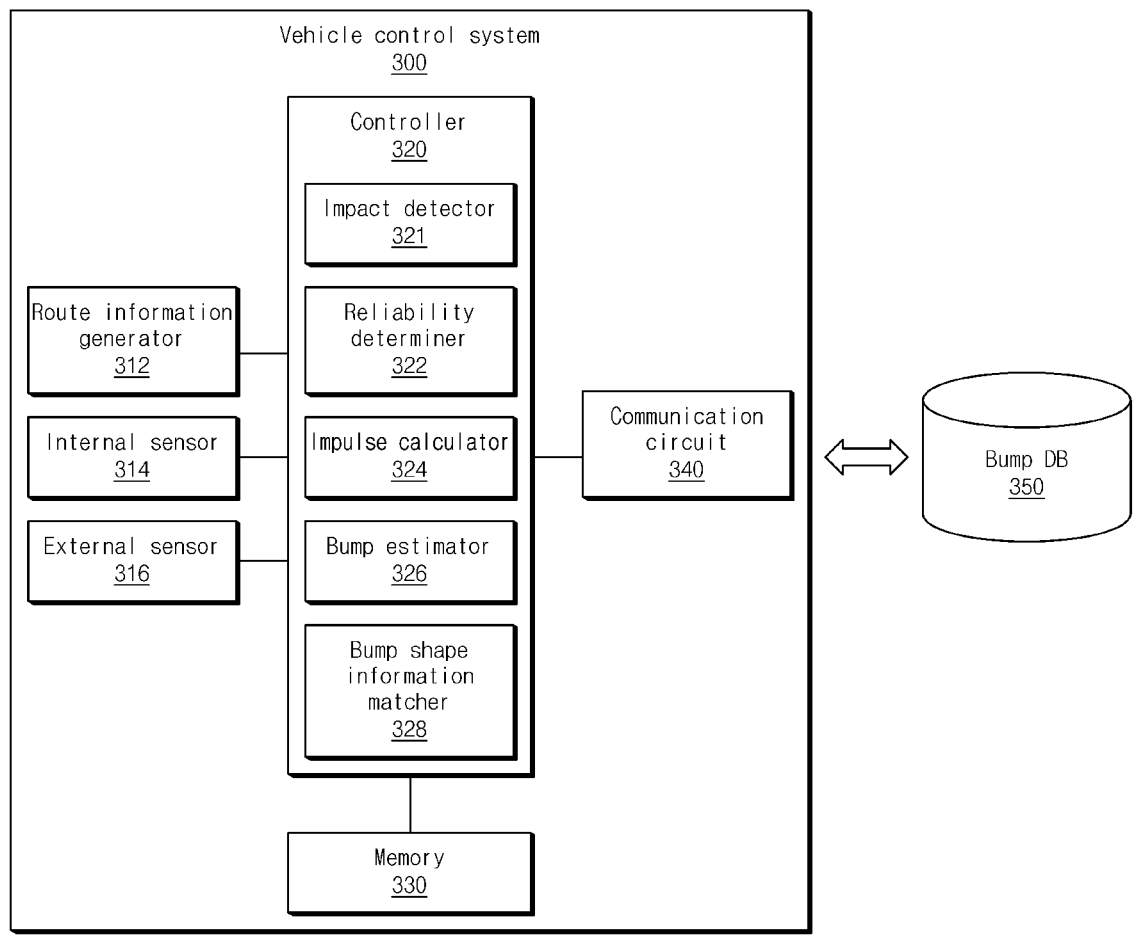
FIG. 3 illustrates a block diagram of a vehicle control system according to various embodiments.

FIG. 3 illustrates a block diagram of a vehicle control system according to various embodiments.

Referring to FIG. 3, a vehicle control system 300 may include a route information generator 312, an internal sensor 314, an external sensor 316, a controller 320, a memory (i.e., a storage) 330, and a communication circuit 340. In addition to the configurations illustrated in FIG. 3, the vehicle control system 300 may further include configurations (e.g., a steering system, a driver, a brake, headlamps, and gears) for driving the vehicle. Furthermore, among the configurations of the vehicle control system 300, which are illustrated in FIG. 3, some of them may be omitted. For example, the vehicle control system 300 may not include the external sensor 316 for reduction of costs.

The route information generator 312 may generate route information of the vehicle. The route information may represent a current location of the vehicle or a driving route to a destination. For example, the route information generator 312 may include a navigation system that is configured to generate a driving route, and a positioning system that is configured to measure the current location of the vehicle. The positioning system may measure the current location of the vehicle by utilizing a system such as a GPS, but the present disclosure is not limited thereto.

The internal sensor 314 may include at least one of a displacement sensor, an acceleration sensor, a gyro sensor, a wheel speed sensor, a suspension, an inertial measurement unit (IMU), a vehicle network, or a jerk sensor, to calculate a load weight or a driving state of the vehicle, or an impulse when the vehicle passes on the bump. For example, the internal sensor 314 may measure at least one of a speed, an acceleration, a yaw rate, a pitch angle, or a pitch angular speed. As another example, the internal sensor 314 may include a sensor (e.g., a microphone) for measuring driving noise or a sensor (e.g., a camera) for capturing a driving image.

The external sensor 316 may include at least one of sensors, such as a camera, a radar device, an ultrasonic sensor, or a lidar device, which may detect an external object (e.g., a bump) of the vehicle. In this case, the external sensor 316 may measure a location or a shape (e.g., a height, a width, or an angle) of the bump.

The communication circuit 340 may be used to acquire data from a bump database (DB) 350 and update the data of the bump DB 350. For example, the communication circuit 340 may perform wireless communication with the bump DB 350, but the form of the wireless communication is not limited thereto.

The controller 320 may be a control device for controlling the configurations in the vehicle. The controller 320, for example, may be referenced by a processor or an electronic control unit (ECU). The controller 320 may be connected to the route information generator 312, the internal sensor 314, the external sensor 316, the communication circuit 340, and the memory 330 to perform general functions of the vehicle control system 300. For example, the controller 320 may be connected to other configurations through a controller area network (CAN) protocol. The controller 320 may include an impact detector 321, a reliability determiner 322, an impulse calculator 324, a bump shape estimator 326, and a bump information matcher 328. The configurations included in the controller 320 may be software (e.g., programs or applications) stored in the form of instructions in the memory 330, as well as hardware configurations.

The impact detector 321 may detect an impact of the vehicle through the internal sensor 314. For example, the impact detector 321 may detect the impact through a change in at least one of a speed, an acceleration, a yaw rate, an angle, or an angular speed.

The reliability determiner 322 may determine a reliability for the impact detected through the internal sensor 314. For example, the reliability determiner 322 may identify a plurality of change values measured through a plurality of sensors, and may filter out, among the plurality of change values, some change values, the results of which are different from many change values. Furthermore, the reliability determiner 322 may identify whether the impact detected through the measured change values means an actual impact or a mis-detected impact.

The impulse calculator 324 may calculate an impulse by using the values measured through the internal sensor 314. The impulse may be expressed by a physical quantity, such as an acceleration, a vehicle, or a displacement, which is used for dynamic analysis of the vehicle.

The bump shape estimator 326 may estimate the shape of the bump for the detected impact. For example, the bump shape estimator 326 may predict the shape of the bump by using the dynamic model of the vehicle and the impulse calculated by the impulse calculator 324.

The bump information matcher 328 may match the bump information (hereinafter, 'first bump information') that represents the estimated shape of the bump and the bump information (hereinafter, 'second bump information') acquired from the bump DB 350. The bump information may include location information that represents the location of the bump and impulse data, as well as the shape of the bump. For example, the bump information matcher 328 may acquire the location information of the bump corresponding to the impact detected by using the route information generator 312, and may search the bump DB 350 for the second bump information that represents the same location as the acquired location information. The bump information matcher 328 may determine a similarity between the first bump information and the second bump information by comparing the impulse data or the bump shape of the first bump information and the second bump information that represent the same location. The bump information matcher 328 may update the bump information of the bump DB 350 according to a matching result. For example, the bump information matcher 328 may replace the bump information of the bump DB 350 with the first bump information or may maintain the bump information of the bump DB 350. As another example, when an impact that represents the first bump information is not present but the second bump information represents a specific impact even though the location is the same, it means that the existing bump disappears, and thus the bump information matcher 328 may delete the second bump information.

The memory 330 may be a non-transitory readable recording medium that stores instructions for the controller 320 to execute the general operations of the vehicle control system 300. The memory 330 may store the data (e.g., the impulse data or the bump information) calculated by the controller 320. The memory 330 may store vehicle information. The vehicle information, for example, may include a tolerance weight, an entire length, an entire width, an entire height, a wheel base, and a wheel track of the vehicle. As another example, the memory 330 may store the dynamic model of the vehicle.

Figure 4:
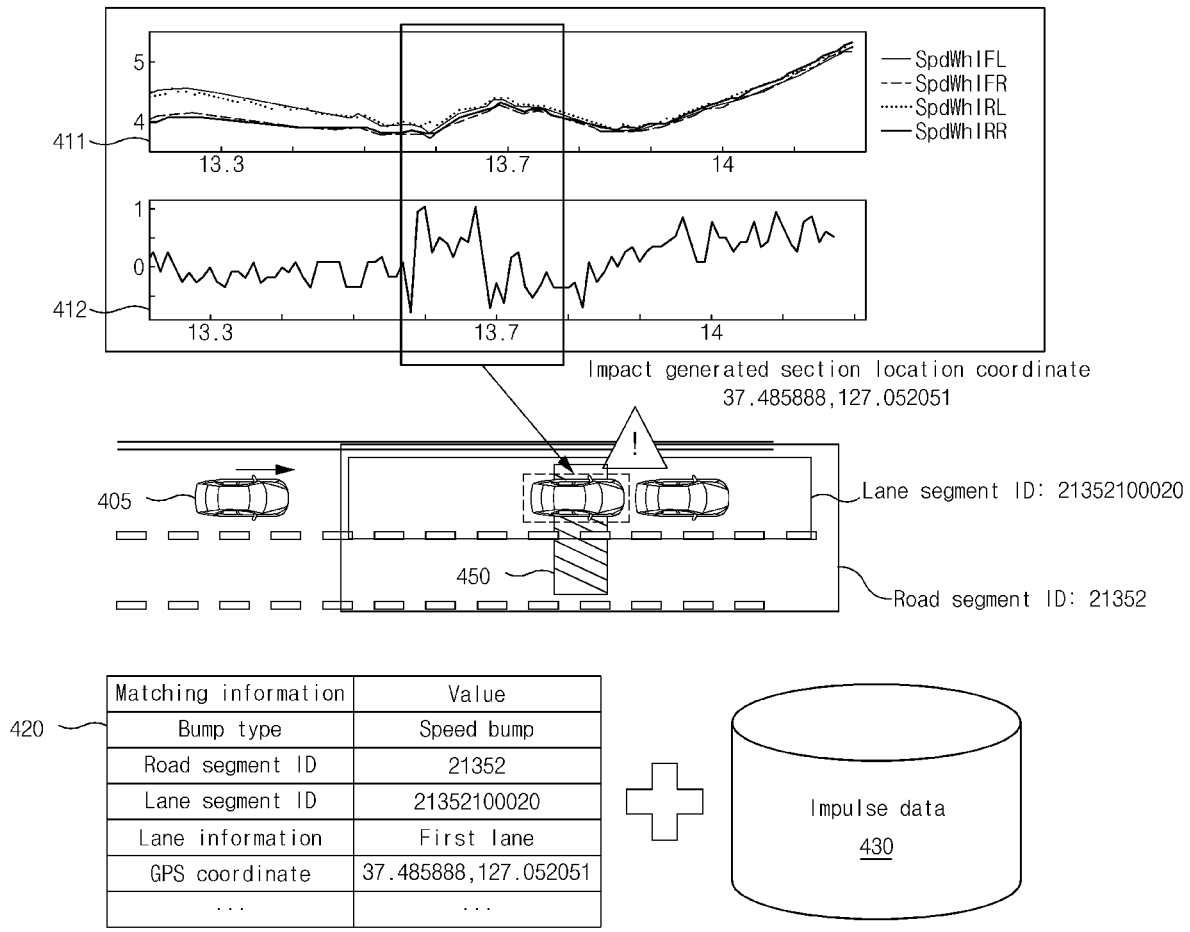
FIG. 4 illustrates an operation of analyzing an impact according to various embodiments.

FIG. 4 illustrates an operation of analyzing an impact according to various embodiments.

Referring to FIG. 4, the transverse axis and the longitudinal axis of a graph 411 represents time (unit: sec) and wheel speed (unit: m/s), respectively, and the transverse axis and the longitudinal axis of a graph 412 represents time (unit: sec) and longitudinal acceleration (unit: $m/s^2$), respectively. A vehicle 405 may detect an impact generated when the vehicle 405 passes on the bump 450, and may acquire information related to the detected impact. In an embodiment, the impact detector 321 of the vehicle control system 300 may identify whether an impact is present by monitoring the values measured through the internal sensor 314 while the vehicle 405 travels. For example, the impact detector 321 may detect whether an impact is present by measuring a change in the wheel speed or a change in the longitudinal acceleration according to time as illustrated in the graph 411 or the graph 412. As another example, the impact detector 321 may identify whether an impact is present based on at least one of whether the vertical acceleration of the vehicle 405 is a reference or more, whether a change rate of the pitch angle of the vehicle 405 is a reference or more, whether a change rate of the displacement of the suspension and the displacement of the suspension change at the same time, whether an object, such as a line or a border of a road, which is recognized by the camera moves by a reference or more, or whether an impact sound measured by the microphone is a reference or more. The reliability determiner 322 may recognize that a corresponding measured value is mis-detected when one of a plurality of measured values represents a result that is different from the other measured results, and then exclude the corresponding measured value.

The impact detector 321 may acquire matching information of a location (that is, the bump 450), at which an impact is detected, through the graphs 411 and 412 or the measured values. The matching information may represent a bump type, a lane segment ID, a road segment ID, lane information, or a location coordinate (e.g., a GPS coordinate). The impact detector 321 may acquire the matching information based on the route information generated by the route information generator 312.

The impulse calculator 324 may calculate an impulse through the graphs 411 and 412 or the measured values, and may generate impulse data 430. The impulse, for example, may be expressed by a physical quantity including an acceleration, a speed, and a displacement for dynamic analysis of the vehicle.

Figure 5:
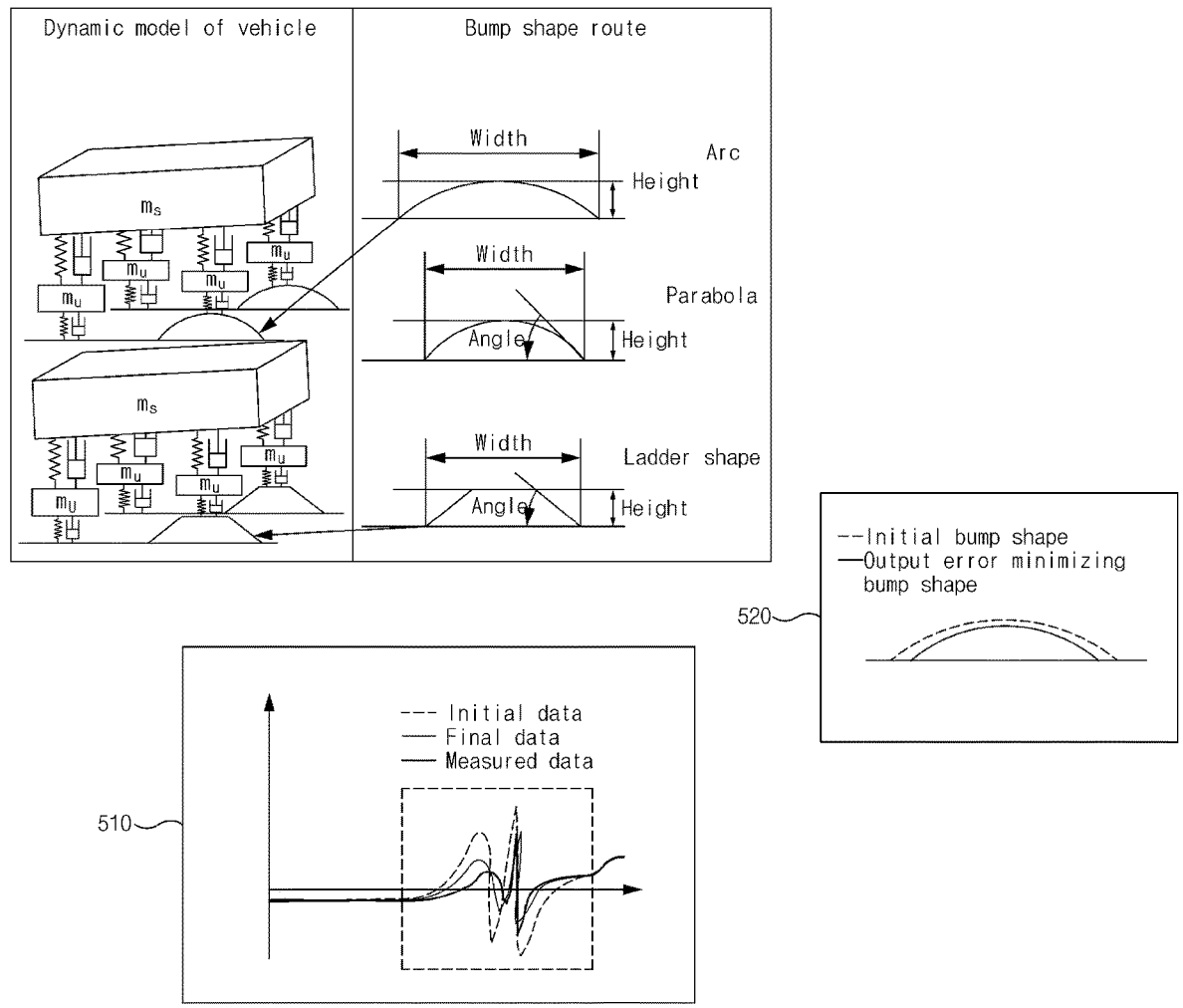
FIG. 5 illustrates an operation of analyzing a bump shape according to various embodiments.

FIG. 5 illustrates an operation of analyzing a bump shape according to various embodiments.

Referring to FIG. 5, the bump shape estimator 326 may estimate the shape of the bump, through which the vehicle has passed, based on the impulse data 430. In an embodiment, the bump shape estimator 326 may estimate the shape of the bump by using the dynamic model of the vehicle. The bump shape estimator 326 may calculate a response through a Fourier transform if the movement of the vehicle is linear and the shape of the bump is expressed in a sine form when the dynamic model of the vehicle is used, but the precision of the estimation becomes lower because the movement of the vehicle when the vehicle passes on the bump is not linear. The bump shape estimator 326 according to the embodiment may calculate prediction data for the impulse based in the initially estimated bump shape, and may use an optimization technique such that an error between the prediction data (initial data) and the actually measured impulse data may be minimized as illustrated in a graph 510. Because there may be a limit in performing the optimization technique as the degree of freedom of the bump shape is high, the bump shape estimator 326 according to the embodiment may classify the bump shape into specific forms (e.g., an arc, a parabola, a ladder shape, a triangle, and the like) to simplify a parameter that represents the bump shape. Because the degree of freedom of the bump shape decreases when the form is classified into a specific value, the optimization technique may be applied more easily. The bump shape estimator 326 may determine a bump shape that minimizes an output error in bump shape information 520.

Figure 6:
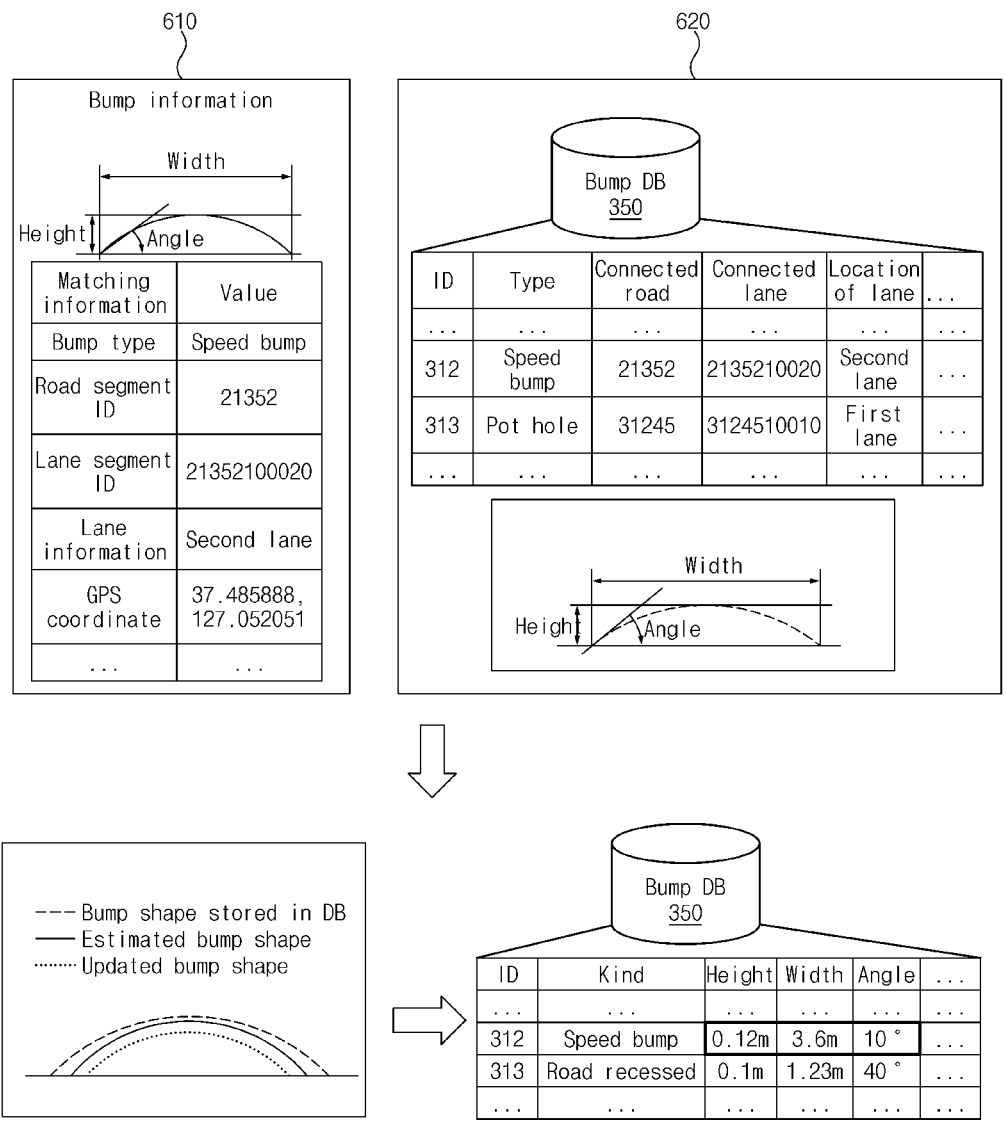
FIG. 6 illustrates an operation of matching bump information according to various embodiments.

FIG. 6 illustrates an operation of matching bump information according to various embodiments.

Referring to FIG. 6, the bump information matcher 328 may match first bump information 610 generated through FIGS. 4 and 5 and second bump information 620 stored in the bump DB 350, and may update the bump DB 350 according to a matching result. The updating may be based on methods, such as a moving average filter, a recursive least square, and a Kalman filter, which consider the number of data or a reliability. In an embodiment, the bump information matcher 328 may search the bump DB 350 for the second bump information 620 that represents matching information that is the same as the matching information of the first bump information 610. In consideration of a measurement error, the bump information matcher 328 may search for bump information on bumps on surrounding roads together. The bump information matcher 328 may compare impulse data or bump shape information of bump information, the matching information of which is the same or similar. Because the reliability becomes problematic when the bump DB 350 has no update history for a long time, the bump information matcher 328 may update the bump DB 350 in consideration of the comparison result and the reliability of the bump DB 350. For example, when the bump DB 350 has no bump shape information and the update history of the bump DB 350 is old while the first bump information 610 contains bump shape information, the bump information matcher 328 may add the bump shape that represents the first bump information 610 to the bump DB 350, and in an opposite case, may delete the bump shape information stored in the bump DB 350.

Figure 7:
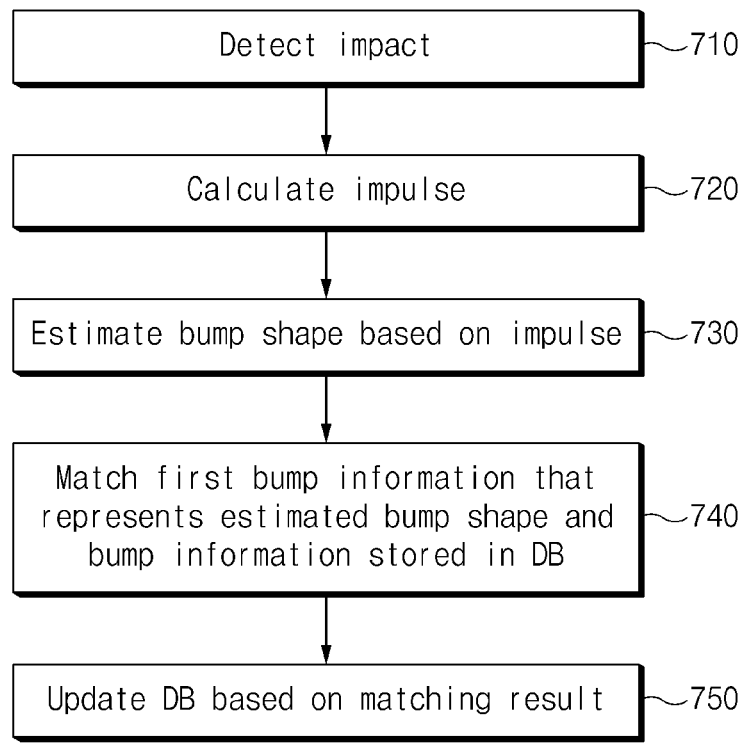
FIG. 7 illustrates a flowchart of an operation of updating bump information according to various embodiments.

FIG. 7 illustrates a flowchart of an operation of updating bump information according to various embodiments. The operations of the flowchart of the operations, which will be described below, may be implemented by the vehicle control system 300 or may be implemented by the configurations (e.g., the controller 320) included in the vehicle control system 300.

Referring to FIG. 7, in operation 710, the vehicle control system 300 may detect an impact. For example, the controller 320 may identify whether an impact is present according to a value measured through the internal sensor 314. In operation 720, the vehicle control system 300 may calculate an impulse based on the measured value.

In operation 730, the vehicle control system 300 may estimate a bump shape corresponding to the impact based on the calculated impulse.

In operation 740, the vehicle control system 300 may match first bump information that represents the estimated bump shape and second bump information stored in a database (e.g., the bump DB 350). For example, the vehicle control system 300 may compare impulse data or bump shape information of the bump information.

In operation 750, the vehicle control system 300 may update the database based on a matching result. For example, the vehicle control system 300 may add, change, or delete the bump information stored in the database.

Figure 8:
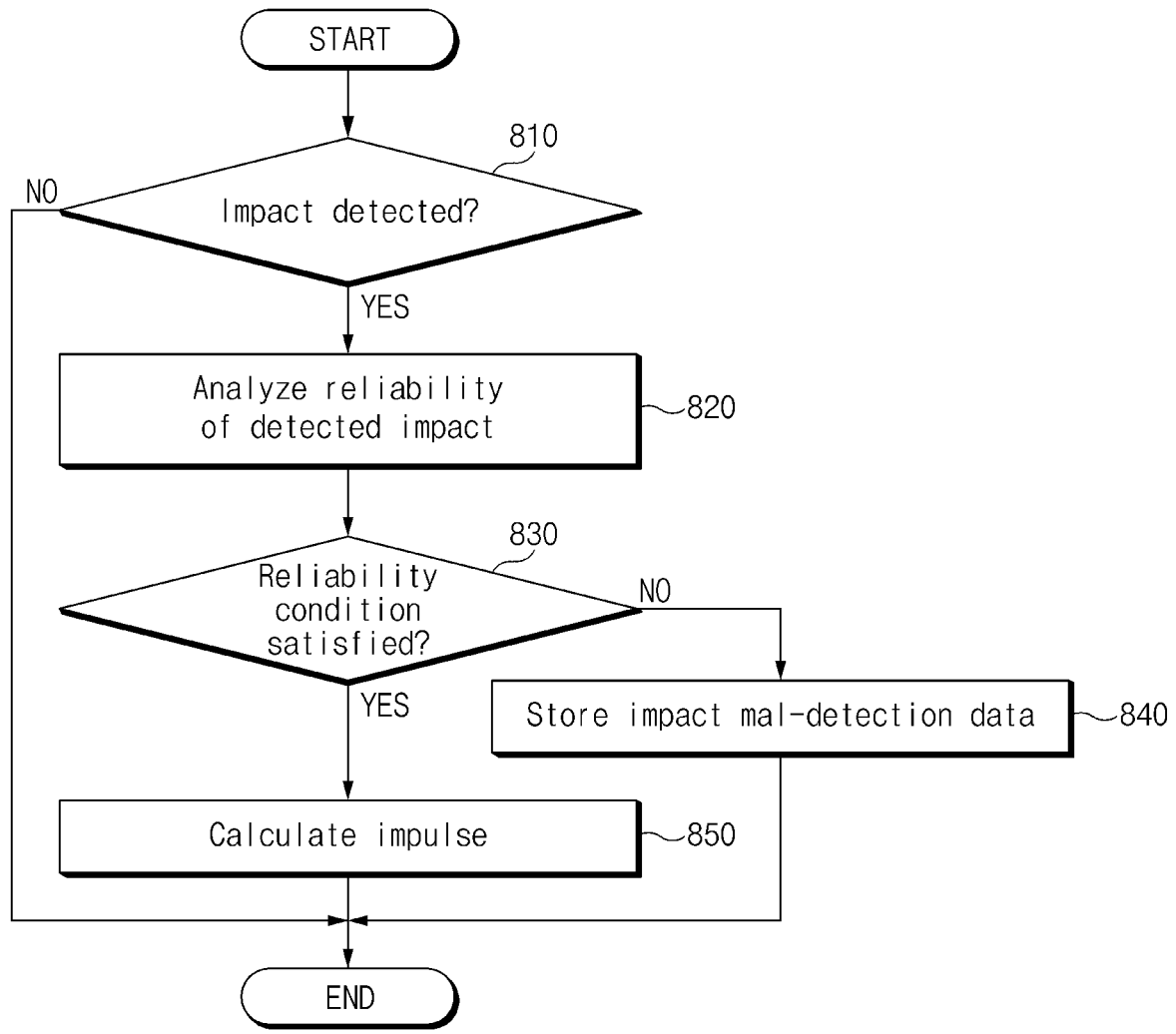
FIG. 8 illustrates a flowchart of an operation of calculating an impulse according to various embodiments.

FIG. 8 illustrates a flowchart of an operation of calculating an impulse according to various embodiments. The operations illustrated in FIG. 8, for example, may be an embodiment of operations 710 and 720 of FIG. 7.

Referring to FIG. 8, in operation 810, the vehicle control system 300 may identify whether an impact is detected (e.g., operation 710 of FIG. 7). When an impact is not detected, an algorithm may be ended.

When an impact is detected, in operation 820, the vehicle control system 300 may analyze the reliability of the detected impact. For example, the controller 320 may determine a mis-detection when there is, among the plurality of values measured through the internal sensor 314, a value that deviates a threshold value or has a result that is different from the other values. As another example, the controller 320 may determine a reliability through comparison of the measured values.

In operation 830, the vehicle control system 300 may identify whether the analyzed reliability satisfies a reliability condition. For example, when the number of the values determined to be the mis-detection is a specific number or more or the reliabilities of the measured values are less than a threshold value, it may be determined that the reliability condition is not satisfied. In this case, in operation 840, the vehicle control system 300 may store impact mis-detection data in the database. The reliability of the database, in which the impact mis-detection data are stored, is changed to be lower, and thereafter, the vehicle control system 300 may use the changed reliability when analyzing the reliability of the database as in FIG. 10.

When the reliability condition is satisfied, in operation 850, the vehicle control system 300 may calculate an impulse based on the measured values.

Figure 9:
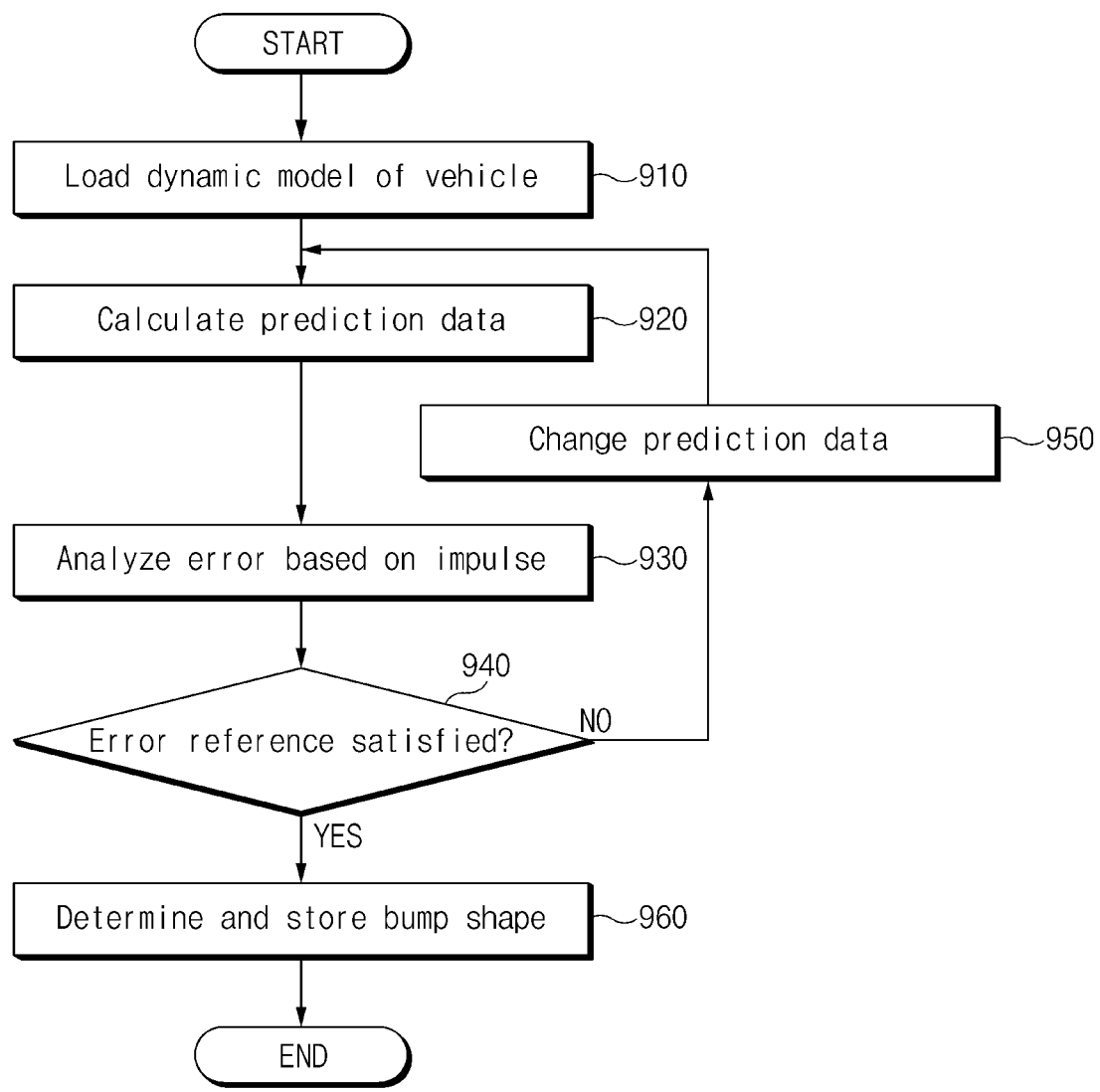
FIG. 9 illustrates a flowchart of an operation of estimating a bump shape according to various embodiments.

FIG. 9 illustrates a flowchart of an operation of estimating a bump shape according to various embodiments. The operations illustrated in FIG. 9, for example, may be an embodiment of operation 730 of FIG. 7.

Referring to FIG. 9, in operation 910, the vehicle control system 300 may load a dynamic model of the vehicle. The vehicle control system 300 may estimate an initial bump shape by using the loaded dynamic model of the vehicle.

In operation 920, the vehicle control system 300 may calculate prediction data for an impulse based on the dynamic model of the vehicle and the initial bump shape. The vehicle control system 300 may analyze an error between the prediction data calculated and the actually measured impulse data in operation 930, and may identify whether the analyzed error satisfies an error reference in operation 940.

When the error reference is not satisfied, the vehicle control system 300 may change the prediction data to minimize the error in operation 950, and may repeat operations 920 to 940 based on the changed prediction data. When the error reference is satisfied, in operation 960, the vehicle control system 300 may determine a bump shape corresponding to the prediction data and may store bump shape information.

Figure 10:
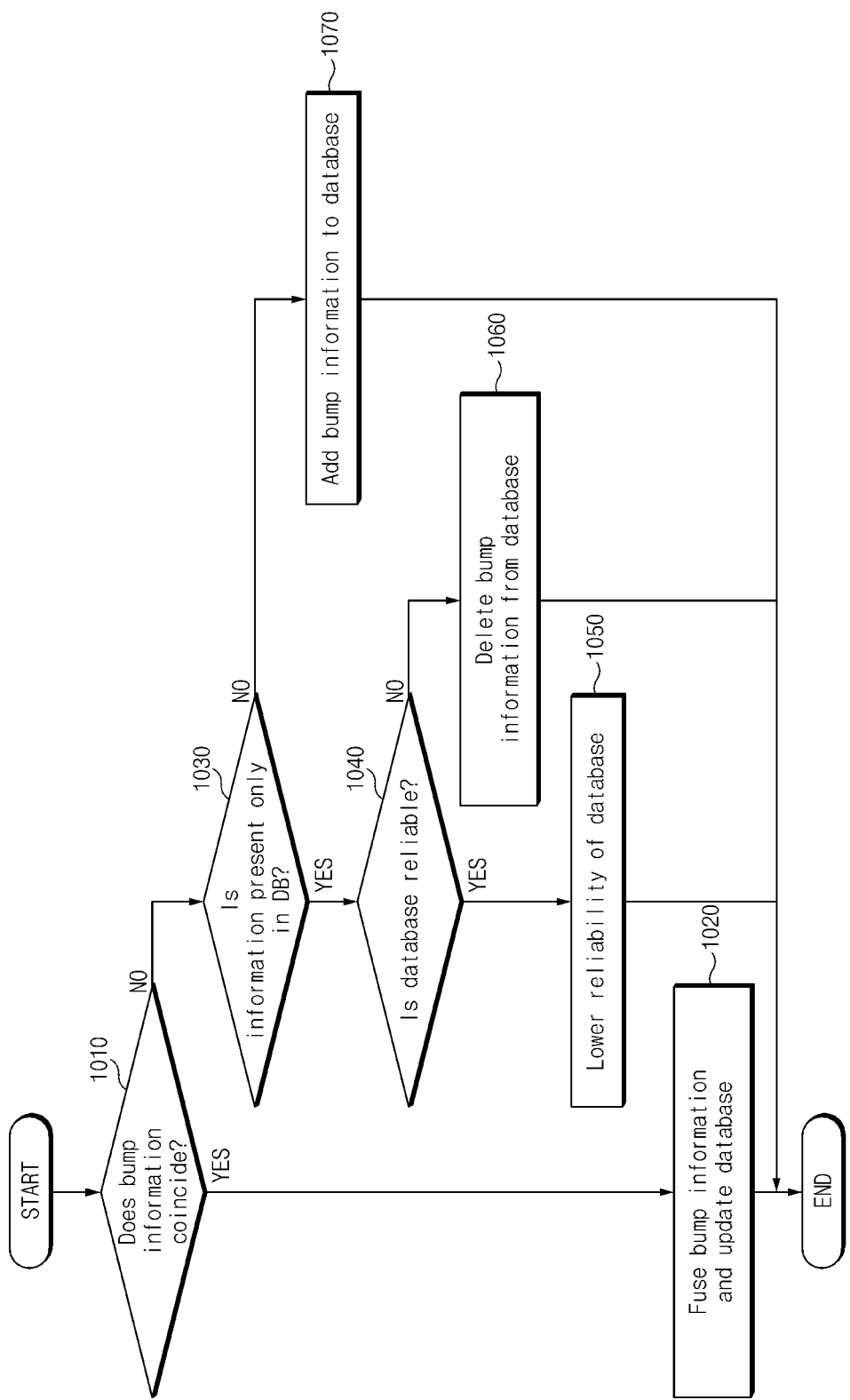
FIG. 10 illustrates a flowchart of an operation of matching and updating bump information according to various embodiments.

FIG. 10 illustrates a flowchart of an operation of matching and updating bump information according to various embodiments. The operations illustrated in FIG. 10, for example, may be an embodiment of operations 740 and 750 of FIG. 7.

Referring to FIG. 10, in operation 1010, the vehicle control system 300 may identify whether the first bump information and the second bump information coincide with each other. For example, the vehicle control system 300 may compare at least one of matching information, bump shape information, or impulse data that represent the location of the bump. When the bump information coincides, in operation 1020, the vehicle control system 300 fuses the first bump information and the second bump information and updates the database.

When the bump information does not coincide, in operation 1030, the vehicle control system 300 may identify whether bump shape information or impulse data are present only in the database.

When the bump shape information or the impulse data are present only in the database, in operation 1040, the vehicle control system 300 may determine the reliability of the database. For example, the vehicle control system 300 may determine the reliability by using at least one of the number of data of the database, the frequency of recording, or a recording date. In an embodiment, when the history of storing impact mis-detection data is present in the database (e.g., operation 840 of FIG. 8), the vehicle control system 300 may set the reliability of the database to be lower before operation 1040.

Because the results of the first bump information and the second bump information are different even though the reliability of the database is high, in operation 1050, the vehicle control system 300 may lower the reliability of the database. When the reliability of the database is low, the vehicle control system 300 may delete the bump information from the database while reflecting the first bump information.

When the bump shape information or the impulse data are present not only in the database (that is, when a bump is present in the first bump information), in operation 1070, the vehicle control system 300 may add bump information to the database or change the bump information in the database based on the first bump information.

Figure 11:
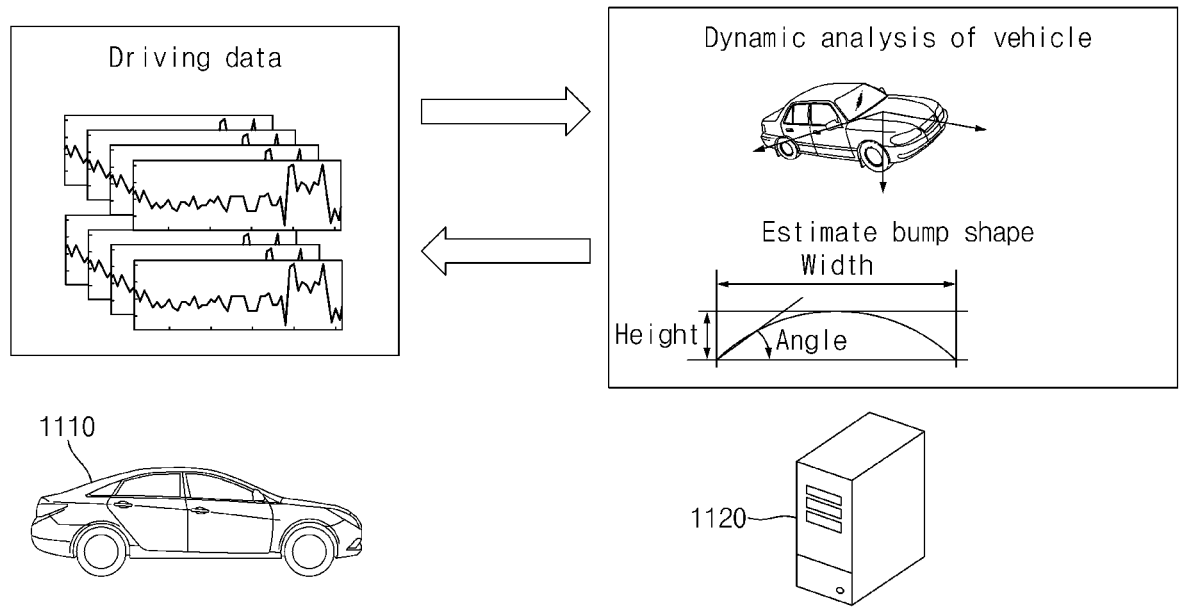
FIG. 11 illustrates an operation of estimating a bump shape by using an external server according to various embodiments.

FIG. 11 illustrates an operation of estimating a bump shape by using an external server according to various embodiments.

Referring to FIG. ii, the vehicle control system 300 included in a vehicle 1110 may generate only driving data including route information, a driving speed, and an impulse, and may request an external server 1120 to estimate the bump shape. Through this, a calculation load of the vehicle control system 300 may be reduced. Furthermore, because a hardware performance of the external server 1120 is higher than that of the vehicle control system 300, a precision of the bump shape estimation result may increase.

Figure 12:
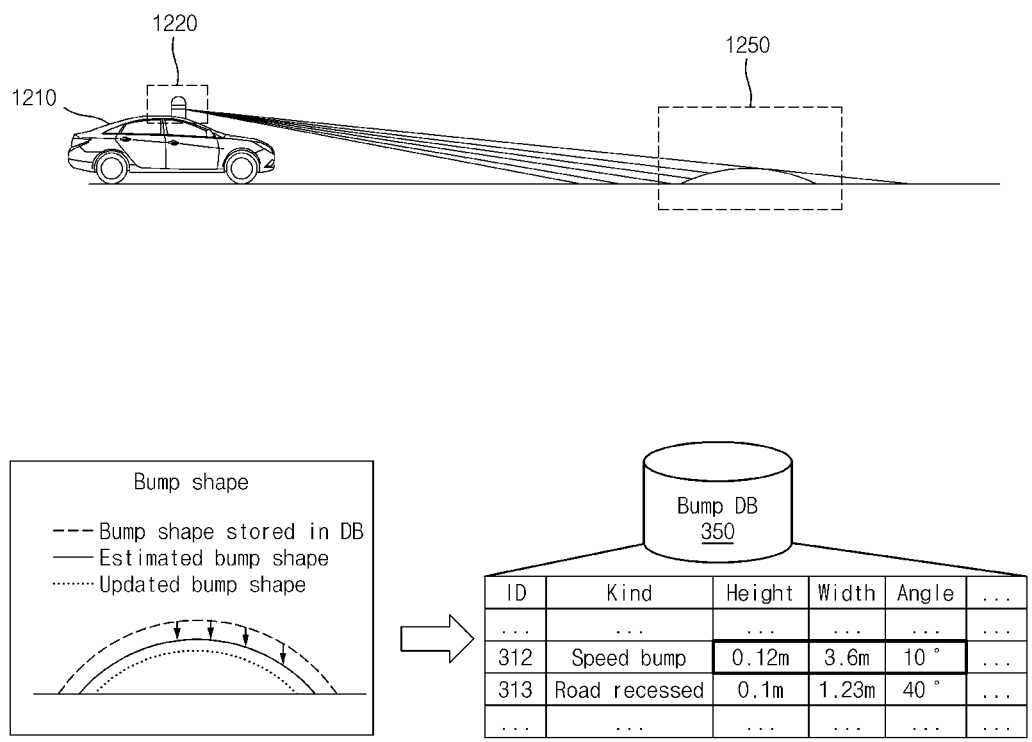
FIG. 12 illustrates an operation of estimating a bump shape by using a sensor according to various embodiments.

FIG. 12 illustrates an operation of estimating a bump shape by using a sensor according to various embodiments.

Referring to FIG. 12, a vehicle 1210 may further include a sensor 1220 (e.g., the external sensor 316 of FIG. 3) such as a lidar device or a camera. The vehicle control system 300 may reduce a calculation time for estimating a bump shape by measuring the shape of a bump 1250 through the sensor 1220, and may increase the precision of measurement. Furthermore, because the precision of the bump shape measured through the vehicle 1210 increases, the precision of the bump DB 350 also may be increased when the data measured by the vehicle 1210 is updated in the bump DB 350.

Figure 13:
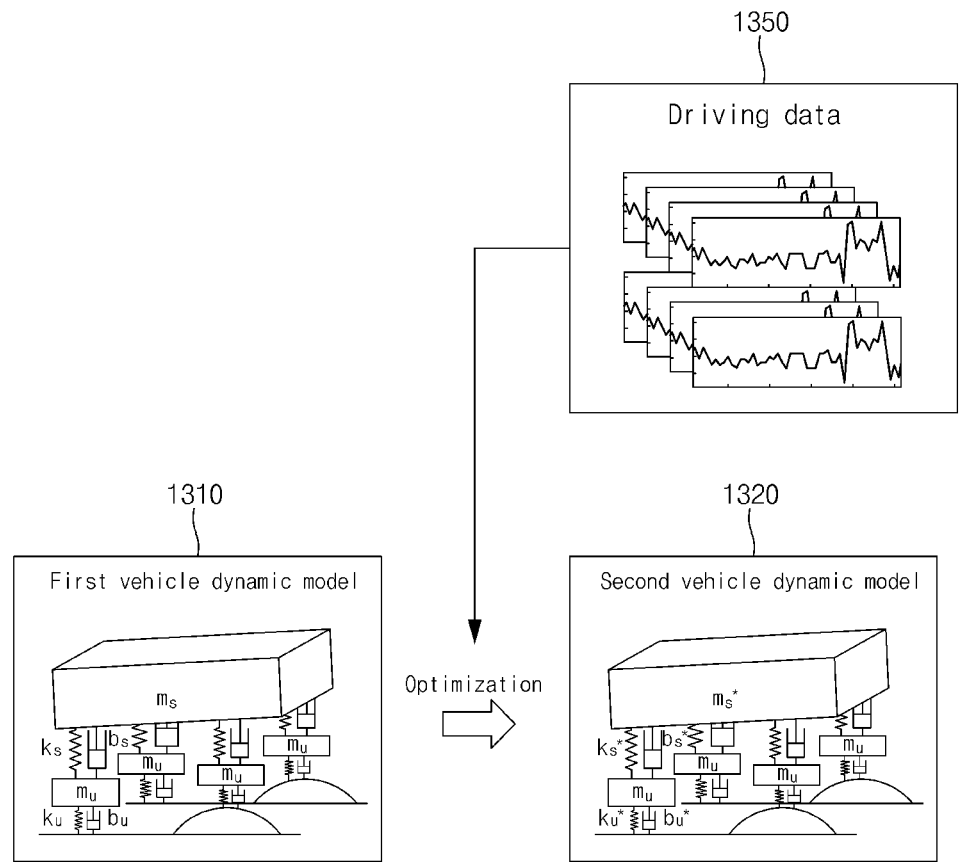
FIG. 13 illustrates an operation of optimizing a dynamic model of a vehicle according to various embodiments.

FIG. 13 illustrates an operation of optimizing a dynamic model of a vehicle according to various embodiments.

Referring to FIG. 13, the vehicle control system 300 may generate a second vehicle dynamic model 1320, the reliability of which has been increased, by allowing a first vehicle dynamic model 1310 to learn driving data 1350. The trained second vehicle dynamic model 1320 may reduce an error between the impulse according to the bump shape and the vehicle dynamic model, and may increase the precision of the estimation of the bump shape.

According to the embodiments of the present disclosure, the vehicle control system may allow a driver to recognize whether there is a change in an existing impact causing factor in real time by storing data related to a bump in a database, and updating the stored data through a vehicle that is traveling.

According to the embodiments of the present disclosure, the vehicle control system may make information related to an obstacle more precise by reflecting new information in information stored in an existing database, and accordingly may predict an impact more precisely.

According to the embodiments of the present disclosure, the vehicle control system may increase the reliability of information on an obstacle without using a sensor of a high price.

According to the embodiments of the present disclosure, the vehicle control system may also allow another vehicle to reduce an impact due to an obstacle by storing an impulse that varies according to a kind and a form of the obstacle, a state of a road surface, a driving speed, a driving environment, a kind and a loading state of the vehicle in a database.

According to the embodiments of the present disclosure, the vehicle control system may secure the reality of data simply by detecting an impact without any separate measurement of a road surface even though the road surface is changed.

According to the embodiments of the present disclosure, the vehicle control system may set a pass speed or generate an avoidance route by allowing a vehicle that cannot measure a road surface to predict an impact due to an obstacle.

In addition, embodiments of the present disclosure may provide various effects that are directly or indirectly recognized.

What is claimed is:

1. A vehicle control system for use in a vehicle, the vehicle control system comprising:
    a communication circuit to be located within a vehicle body of the vehicle;
    an internal sensor to be located in a forward facing direction of the vehicle; and
    a controller connected to the communication circuit and the internal sensor, wherein the controller is configured to:
        detect an impact to the vehicle through the internal sensor;
        calculate an impulse for the detected impact;
        determine an initially estimated bump shape based on the calculated impulse;
        classify the initially estimated bump shape into a specific form;
        load a dynamic model of the vehicle;
        calculate prediction data based on the dynamic model of the vehicle;
        analyze an error of the prediction data based on the calculated impulse and the initially estimated bump shape classified as the specific form;
        repeat analyzing of the error of the prediction data after the prediction data is changed based on the error when the error does not satisfy an error reference;
        determine an estimated bump shape based on the prediction data when the error satisfies the error reference;
        match first bump information that represents the estimated bump shape and second bump information acquired from a database by using the communication circuit;
        update bump information of the database based on a matching result; and
        cause a driving speed of the vehicle to be reduced in response to detecting the impact to the vehicle and based on the estimated bump shape.

2. The vehicle control system of claim 1, wherein the controller is configured to:
    analyze a reliability for the detected impact;
    calculate the impulse when the reliability satisfies a specific reliability condition; and
    store impact mis-detection data in the database when the reliability does not satisfy the specific reliability condition.

3. The vehicle control system of claim 1, further comprising a navigation system configured to generate a driving route of the vehicle and measure a location of the vehicle, wherein the controller is configured to:
    acquire matching information that represents a location of the estimated bump shape by using the navigation system; and
    acquire the second bump information corresponding to the first bump information from the database by using the matching information.

4. The vehicle control system of claim 1, wherein the controller is configured to:
    identify that a bump is present only in the second bump information when the first bump information and the second bump information are different;
    add the first bump information to the database when the bump is present in the first bump information; and
    change a reliability of the database and delete the second bump information when the bump is present only in the second bump information.

5. The vehicle control system of claim 4, wherein the controller is configured to:
    determine the reliability of the database when the bump is present only in the second bump information;
    lower the reliability of the database when the reliability is a threshold value or more; and
    delete the second bump information from the database when the reliability is less than the threshold value.

6. The vehicle control system of claim 5, wherein the controller is configured to lower the reliability of the database when impact mis-detection data are present in the database.

7. The vehicle control system of claim 1, wherein the controller is configured to:
transmit driving data including the calculated impulse to an external server by using the communication circuit; and
acquire data on the estimated bump shape from the external server by using the communication circuit.

8. The vehicle control system of claim 1, further comprising an external sensor, wherein the controller is configured to measure the bump shape by using the external sensor.

9. The vehicle control system of claim 1, wherein the controller is configured to learn the dynamic model of the vehicle used for estimating the bump shape by using driving data including the calculated impulse.

10. A method for controlling a vehicle, the method comprising:
detecting an impact to the vehicle;
calculating an impulse for the detected impact;
estimating a bump shape based on the calculated impulse;
matching first bump information that represents the estimated bump shape and second bump information acquired from a database using a communication circuit;
updating bump information of the database based on a matching result; and
reducing a driving speed of the vehicle in response to detecting the impact to the vehicle and based on the estimated bump shape;
wherein estimating the bump shape comprises:
classifying the bump shape into a specific form;
loading a dynamic model of the vehicle;
calculating prediction data based on the dynamic model of the vehicle;
analyzing an error of the prediction data based on the calculated impulse and the bump shape classified as the specific form;
analyzing the error of the prediction data after the prediction data is changed based on the error when the error does not satisfy an error reference; and
determining the bump shape based on the prediction data when the error satisfies the error reference.

11. The method of claim 10, further comprising:
analyzing a reliability for the detected impact;
calculating the impulse when the reliability satisfies a specific reliability condition; and
storing impact mis-detection data in the database when the reliability does not satisfy the specific reliability condition.

12. The method of claim 10, wherein updating the bump information of the database based on the matching result comprises:
identifying that a bump is present only in the second bump information when the first bump information and the second bump information are different;
adding the first bump information to the database when the bump is present in the first bump information;
determining reliability of the database when the bump is present only in the second bump information;
lowering the reliability of the database when the reliability is a threshold value or more; and
deleting the second bump information from the database when the reliability is less than the threshold value.

13. The method of claim 12, further comprising lowering the reliability of the database when impact mis-detection data are present in the database.

14. The method of claim 10, further comprising learning the dynamic model of the vehicle used for estimating the bump shape by using driving data including the calculated impulse.

15. The method of claim 10, further comprising informing a driver the vehicle of an impending impact to the vehicle based on the determined bump shape.

16. The method of claim 10, wherein the impact to the vehicle is detected by a lidar sensor of the vehicle and wherein the second bump information is acquired from the database based on location information of a navigation system of the vehicle.

17. A computer readable non-transitory recording medium configured to store programs for executing operations of:
detecting an impact to a vehicle;
calculating an impulse for the detected impact;
estimating a bump shape based on the calculated impulse;
matching first bump information that represents the estimated bump shape and second bump information acquired from a database;
updating bump information of the database based on a matching result; and
causing a driving speed of the vehicle to be reduced in response to detecting the impact to the vehicle and based on the estimated bump shape
wherein estimating the bump shape based on the calculated impulse comprises:
classifying the bump shape into a specific form;
loading a dynamic model of the vehicle;
calculating prediction data based on the dynamic model of the vehicle;
analyzing an error of the prediction data based on the calculated impulse and the bump shape classified as the specific form;
analyzing the error of the prediction data after the prediction data is changed based on the error when the error does not satisfy an error reference; and
determining the bump shape based on the prediction data when the error satisfies the error reference.

18. A control system comprising a controller coupled to the computer readable non-transitory recording medium of claim 17 and configured to execute the operations.

19. The control system of claim 18, a communication circuit and an internal sensor, wherein the internal sensor is configured to provide an indication of the impact and wherein the second bump information comprises bump information acquired from the database using the communication circuit.

* * * * *